US010409287B2

(12) United States Patent
Scott

(10) Patent No.: US 10,409,287 B2
(45) Date of Patent: Sep. 10, 2019

(54) VEHICLE GUIDE DISPLAY AND PATH NAVIGATION METHOD

(71) Applicant: Komatsu America Corp., Rolling Meadows, IL (US)

(72) Inventor: David J. Scott, Washington, IL (US)

(73) Assignee: Komatsu America Corp., Rolling Meadows, IL (US)

( * ) Notice: Subject to any disclaimer, the term of this patent is extended or adjusted under 35 U.S.C. 154(b) by 128 days.

(21) Appl. No.: 15/827,635

(22) Filed: Nov. 30, 2017

(65) Prior Publication Data

US 2019/0163194 A1    May 30, 2019

(51) Int. Cl.
*B60Q 1/48* (2006.01)
*G05D 1/02* (2006.01)
*B62D 15/02* (2006.01)

(52) U.S. Cl.
CPC ......... *G05D 1/0225* (2013.01); *B62D 15/028* (2013.01); *B60R 2300/806* (2013.01); *G05D 2201/0202* (2013.01)

(58) Field of Classification Search
CPC .......... B60Q 1/48; G05D 1/0225; G05D 2201/0202; B62D 15/028; B60R 2300/806
See application file for complete search history.

(56) References Cited

U.S. PATENT DOCUMENTS

| 6,064,926 A * | 5/2000 | Sarangapani | G05D 1/0289 701/26 |
| 8,437,900 B2 * | 5/2013 | Nishijima | G05D 1/0274 701/23 |
| 8,755,966 B2 * | 6/2014 | Halder | G05D 1/0274 701/25 |
| 10,228,701 B2 * | 3/2019 | Tojima | G01S 13/876 |
| 10,261,511 B2 * | 4/2019 | Masaki | G05D 1/024 |
| 2002/0099481 A1 * | 7/2002 | Mori | G01C 21/12 701/23 |
| 2013/0060458 A1 * | 3/2013 | Makela | E21C 35/08 701/301 |

* cited by examiner

*Primary Examiner* — Phung Nguyen
(74) *Attorney, Agent, or Firm* — Brinks Gilson & Lione

(57) ABSTRACT

A display module and method are disclosed to show the positional relationship of both the direction and distance of a vehicle relative to a desired approach course leading to a loading point.

20 Claims, 9 Drawing Sheets

VEHICLE GUIDE DISPLAY AND PATH NAVIGATION METHOD

BACKGROUND

1. Technical Field

The disclosure relates to vehicular path information which is used for navigation and used for human interface display for vehicular path control. More specifically, the disclosure relates to the determination of positional relationship of both the direction and the distance of the vehicle to that of a predetermined desired straight path to a predetermined desired target location point on that path.

2. Background Information

Operator control of vehicles such as off-highway large dump trucks in mining operations requires the alignment of the vehicle to a virtually straight path approach to a desired stopping point many times on a daily routine basis. This stopping point is commonly named a spot point. The maneuvering of the vehicle while in proximity of the spot point, with the goal of reaching the spot point, is commonly named as a spotting maneuver, or simply spot maneuver. The time spent for the spotting maneuver is commonly named as spotting time, or simply spot time.

Spotting time can become longer when the maneuver must restart because of misalignment of the vehicle at some position during the attempt. This misalignment can be caused by an error in starting point position relative to the desired optimal path starting point. Misalignment can be caused by misinformation or lack of information along the movement of the path to make consistent corrective adjustments to the vehicle path such as to arrive at the desired spot point with the correct alignment of the vehicle.

Similar to misalignment causing increases to the spotting time, an error in position for the stopping point of the vehicle may occur also from misinformation or lack of information to make consistent corrective adjustments to the vehicle speed. This in turn may cause for more spotting time as more maneuvering of the vehicle is required, of which could require a complete full second attempt from the initial starting point.

The spot maneuver is often in a reverse motion of the vehicle. The information for both path and spot point is limited during a spot maneuver because a reverse motion allows less visual reference for full depth perception information to the operator, often with only a small sized mirror (in comparison to that of a full windshield area for forward motion). A camera aide often provides little visualization improvement and often uses a small screen with limited information, providing minimal aide for judgment of distance, speed, and control input feedback because of the camera's two dimensional information capability, small size, and other known reasons.

Often in the spotting maneuver area there are many environmental challenges for the maneuver. A loading tool such as a shovel, a rubber tire wheel loader, an excavator tracked machine, and such other loading tools create visibility reductions from dust and debris in the air introduced from the loading process of material dropping into the haulage trucks, material dropping to the ground, material dropping from rolling tires and moving tracks, and from the collected residues dropping off the machines. This reduced visibility in turn can create conditions where spotting becomes impossible until a sufficiently clear air environment exists, causing reduced production performance due to increased waiting time. Another environmental reduced visibility situation occurs with heavy rain conditions, heavy snow conditions, windy conditions, shadowy lighting conditions both during daytime and nighttime, and direct sunlight angled conditions. These may also cause wait conditions and slowed production, as well as increased risks for collisions between equipment and the haulage truck during the spotting maneuver.

There is a need for a method and device to provide multiple parameters positional navigation information which can be used for a display for human control, used as a sensor type input for machine assisted control, and used for sensor type input for machine automated control.

SUMMARY

In one embodiment, a display module for a vehicle comprises a course deviation indicator that is configured to provide an indication of a first angle between a desired approach course and a first line, where the first line extends between a first point on the vehicle and a virtual origin point. The desired approach course is a desired course for the vehicle to approach a loading point. A heading indicator is configured to provide an indication of a second angle between a vehicle forward alignment and the desired approach course, where the vehicle forward alignment is a longitudinal centerline of the vehicle that extends through the first point on the vehicle. A lateral deviation indicator is configured to provide an indication of a distance from the first point on the vehicle to a loading line, wherein the loading line extends through the loading point. The loading point is located on the desired approach course.

In another embodiment, a method of indicating a position of a vehicle using a display (where the display comprises a course deviation indicator, a heading indicator, and a lateral deviation indicator) may include the steps of establishing a desired approach course that extends through a loading point and a virtual origin point, determining a first angle that is between the desired approach course and a first line (where the first line extends between a first point on the vehicle and the virtual origin point), determining a second angle that is between a vehicle forward alignment and the desired approach course (wherein the vehicle forward alignment is a longitudinal centerline of the vehicle that extends through the first point on the vehicle), determining a distance from the first point on the vehicle to a loading line (where the loading line extends through the loading point), providing an indication of the first angle with the course deviation indicator, providing an indication of the second angle with the heading indicator, and providing an indication of the distance from the first point on the vehicle to the loading line with the lateral deviation indicator.

In another embodiment, a method of positioning a receiving point on a vehicle at a loading point may include the steps of establishing a desired approach course that extends through the loading point and a virtual origin point, determining a first angle that is between the desired approach course and a first line (where the first line is between the receiving point on the vehicle and the virtual origin point), determining a second angle that is between a vehicle forward alignment and the desired approach course (where the vehicle forward alignment is a longitudinal centerline of the vehicle that extends through the receiving point on the vehicle), determining a distance from the receiving point on the vehicle to a loading line (where the loading line extends through the loading point), moving the vehicle toward the loading point, adjusting the motion of the vehicle and vehicle forward alignment relative to the desired approach course based on the first angle and second angle such that the vehicle moves toward the desired approach course, moving the vehicle along the desired approach course, adjusting the motion of the vehicle along the desired approach course based on the distance from the receiving point on the vehicle to a loading line, and stopping the vehicle when the receiving point reaches the loading point.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which.

DETAILED DESCRIPTION OF THE DRAWINGS

Figure 1:
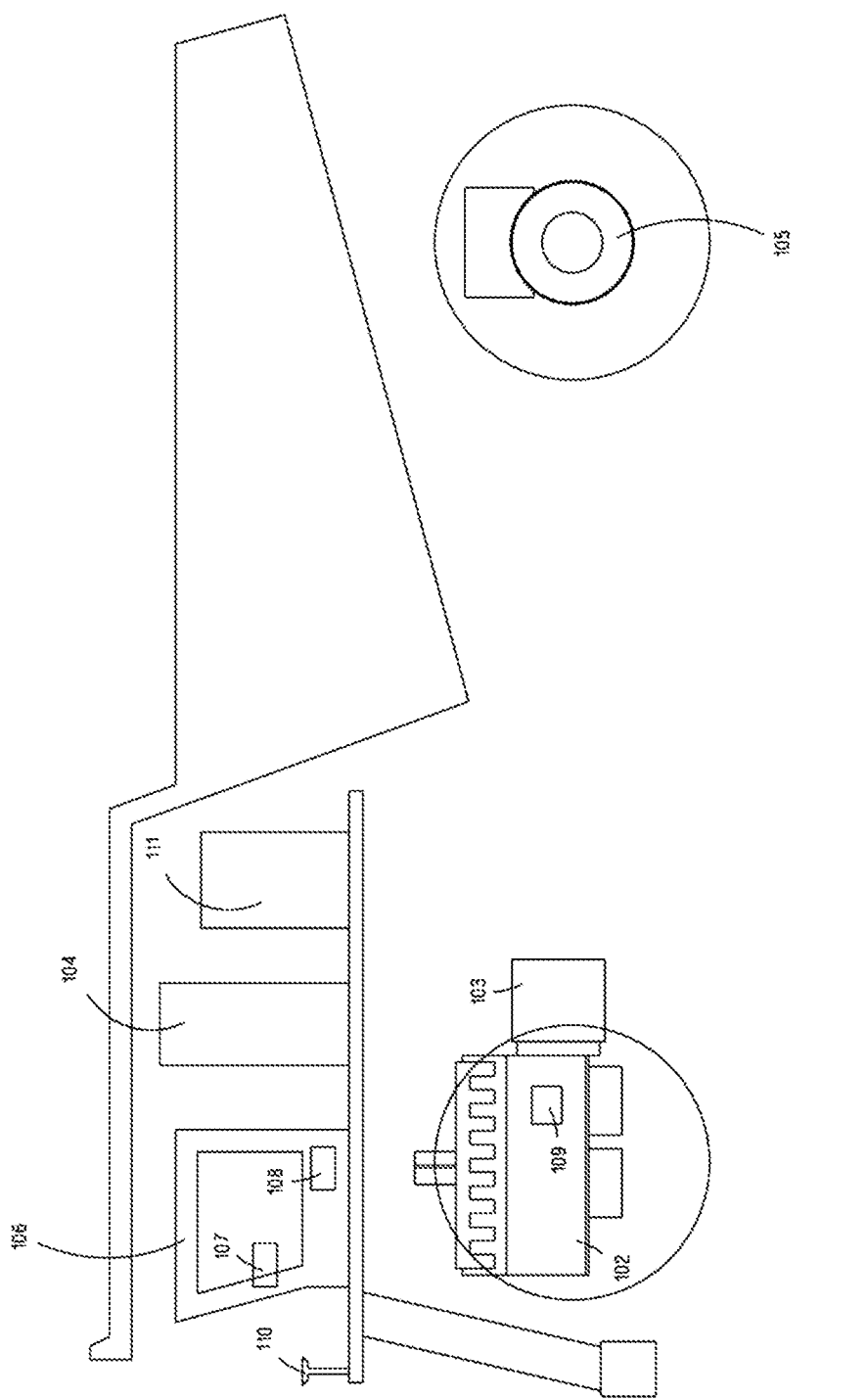
FIG. 1 is a diagram of a vehicle according to one embodiment.

FIG. 1 illustrates a diagram of an example vehicle 101 which may represent an off-highway mining truck used for haulage of material in a mining environment. The example vehicle 101 is purely for description and not to be construed limiting the disclosure only to this example.

The example vehicle 101 includes an engine 102 which provides rotational shaft power to an electrical generation device 103, which in turn provides electrical energy through drive system controls 104. The drive system controls 104 direct the electrical energy to a wheel traction motor 105 for propulsion. The vehicle 101 may have more than one wheel traction motor 105.

When the vehicle 101 is operated in conditions where retarding forces (i.e. speed reducing forces) are required, such as downhill operations or slowing speed operations, rotational energy may be extracted from the wheel traction motor or motors 105 electrically through the drive system controls 104. The extracted electrical energy may be discharged to the ambient air through the drive system component retarding grid 111.

Specific action by the operator in the operator controls station 106 may provide commands which could be mechanical, electrical, radio wave, or other transmitted means. The commands may command the vehicle systems, such as the drive system controls 104, engine controls 109, and other systems controls on the vehicle, whether directly or through drive system controls 104 and or possible other systems of controls.

Within the operator controls station 106 are truck controllers 108, and display dash panel assembly 107 with indicators, gages, lights, and other varied human interface devices for communication from the vehicle to the operator, as well as the reverse, communication from the operator to the vehicle that include instrumentation, switches, levers, displays, wheels, and other such kinds of human to machine interfaces. Machine controllers 108 and other systems controllers such as a payload measurement system controller are also common to this example vehicle 101.

Communication from the truck to off-truck devices can be done through wireless devices 110 as well as global positioning satellite signals reception, data sending and receiving via radio or satellite signals, and other off-truck data transfer systems and devices.

Figure 2:
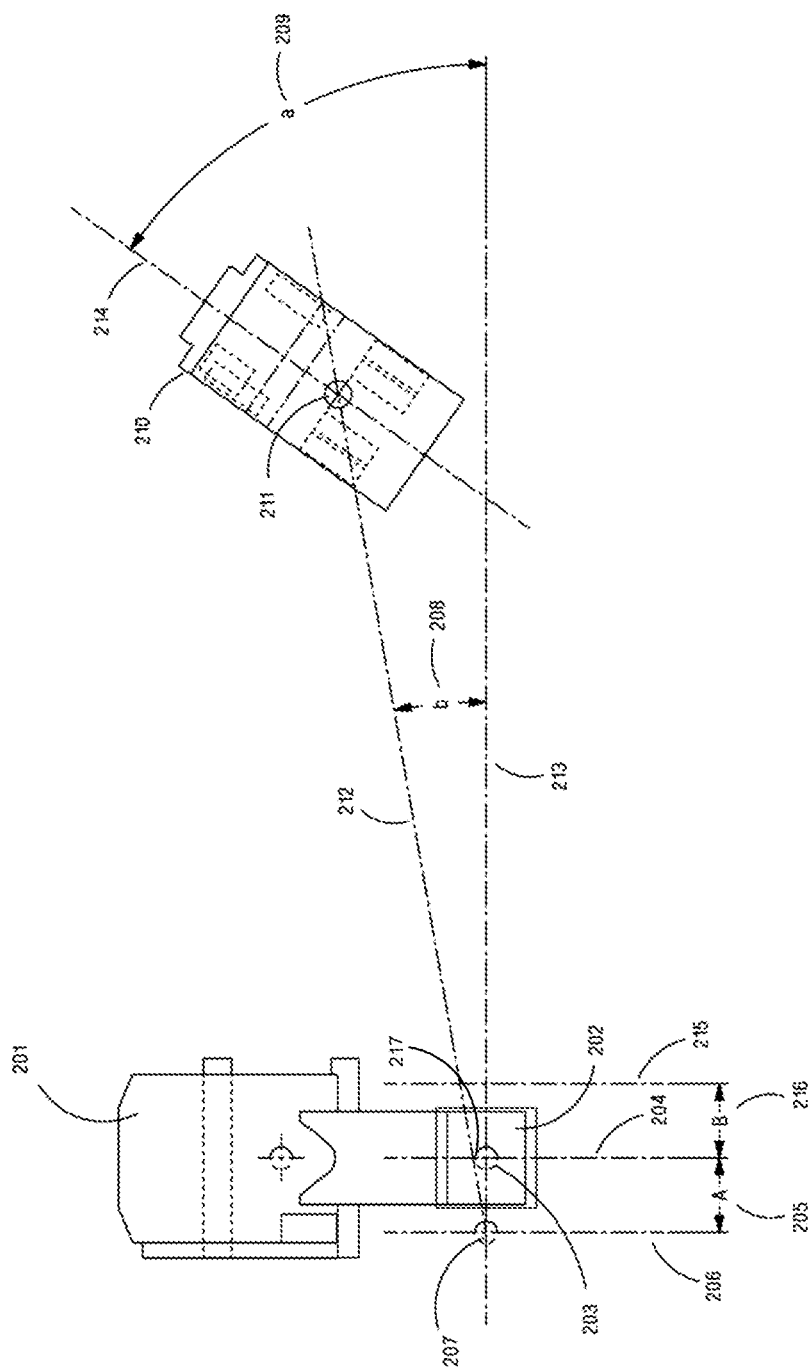
FIG. 2 is a top view positional layout drawing of a vehicle spotting maneuver according to one embodiment.

FIG. 2 is a top view drawing of a dump truck 210 maneuvering towards a loading shovel 201. Target loading point 203 is the center of the bucket 202 portion of the loading shovel 201. The truck 210 receiving point 211 has a desired position at the end of the maneuver to be under the shovel bucket 202 at the target loading point 203. Angle "a" 209 is the directional angle 209 of the truck 210 forward alignment relative to the vector formed from virtual origin point 207 through the target loading point 203 and extending horizontally, which in turn defines the desired approach course 213. Angle "b" 208 is the angle from the desired approach course 213 to that of a position vector line 212 from the virtual origin point 207 to the receiving point 211 on the dump truck 210. The virtual origin point 207 is a point located on the desired approach course 213 behind the target loading point 203 (relative to the location of the truck 210) by a distance A 205 from the bucket line 204 to a bucket parallel line 206. Bucket line 204 is formed by a parallel line to the shovel boom through the target loading point 203. Distance B 216 is an area which begins at the maximum lateral line 215 to the bucket line 204. The maximum lateral line 215 is parallel to the bucket line 204.

Due to the sensitivity of the equipment used to measure the position of the truck 210, there may be no indication of a course deviation from the desired approach course 213 near a point where position vector line 212 intersects desired approach course 213 due to the relatively small difference between position vector line 212 and desired approach course 213 at the intersection point. Accordingly, virtual origin point 207 is used to establish position vector line 212 and angle "b" 208 instead of target loading point 203 in order to provide an indication of a course deviation from the desired approach course 213 when the truck 210 is very near the target loading point 203. Using virtual origin point 207 instead of target loading point 203 moves the intersection point of position vector line 212 and desired approach course 213 away from the target loading point 203 to provide an indication of a course deviation from the desired approach course 213 at the target loading point 203. Using virtual origin point 207 instead of target loading point 203 increases the angle between the receiving point 211 on the truck 210 and the desired approach course 213 such that the angle can be determined within the sensitivity of the equipment used to measure the position of the truck 210 when the truck 210 is very near the target loading point 203. For example, using virtual origin point 207 instead of target loading point 203 provides offset distance 217 along the bucket line 204 between position vector line 212 and the target loading point 203. Offset distance 217 is large enough, given the sensitivity of the equipment used to measure the position of the truck 210, to allow for an indication of a course deviation from the desired approach course 213 near the target loading point 203. For example, offset distance 217 may be approximately 3 feet at a maximum angle "b" 208 of 10 degrees and a distance A 205 of approximately 19 feet.

Figure 3:
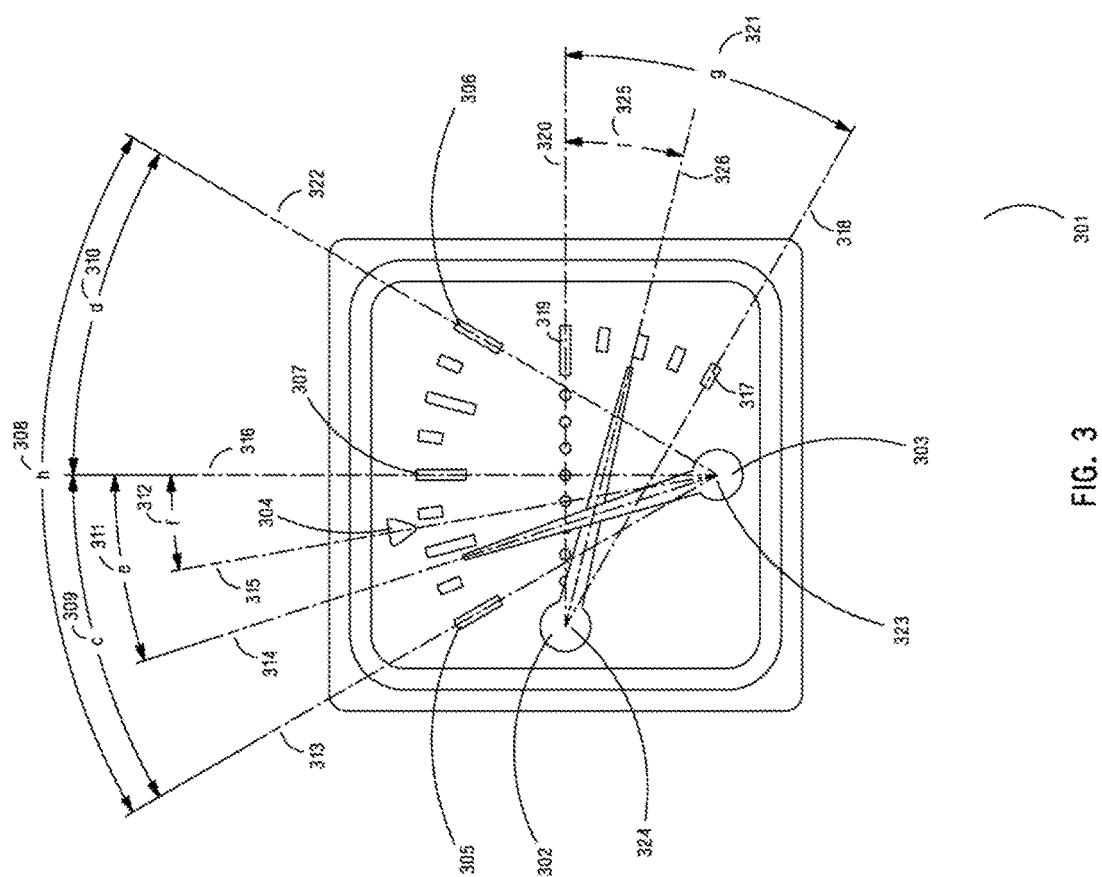
FIG. 3 is an example display interface module according to one embodiment.

FIG. 3 is a front view drawing of one embodiment of an operator interface display 301. The operator interface display 301 contains a course deviation indicator 303 which is a needle which rotates on the course deviation indicator pivot point 323 from a maximum left position mark 305 to a maximum right position mark 306, with, respectively, a maximum left position center line 313 and a maximum right position center line 322. The angle "h" 308 is the full travel angle for the course deviation indicator 303 with a maximum left course deviation indicator 303 travel angle "c" 309 and a maximum right position course deviation indicator 303 travel angle "d" 310 relative to the zero-course deviation indicator 303 position mark 307 and its associated zero-course deviation indicator 303 position center line 316. The course deviation indicator 303 when positioned at the zero-course deviation indicator position center line 316 aligns with the zero-course deviation indicator 303 position mark 307. The heading indicator 304, similar to the course deviation indicator 303, rotates its position from the maximum left position mark 305 to the maximum right position mark 306 using the course deviation indicator pivot point 323 of the course deviation indicator 303. Heading indicator 304 is an indication of the direction of the truck 210 forward alignment relative to the desired approach course 213. Angle "e" 311 is the course deviation indicator angle formed from the zero-course deviation indicator position center line 316 to the course deviation indicator position center line 314, which may be left side position as shown or right side position which is not shown. Angle "e" 311 is related to angle "b" 208 by a scaling or ratio factor, such as 3 to 1, in order to increase the visual indication of angle "e" 311 to an operator of truck 210. For example, angle "e" 311 may be 15 degrees when angle "b" 208 is 5 degrees. Angle "f" 312 is the heading indicator position angle formed from the zero-course deviation indicator position center line 316 to the heading indicator center line 315, which may be a left side position as shown or a right side position which is not shown. Angle "f" 312 is related to angle "a" 209 by a scaling or ratio factor, such as 3 to 1, in order to increase the visual indication of angle "f" 312 to an operator of truck 210. For example, angle "f" 312 may be 9 degrees when angle "a" 209 is 3 degrees.

The lateral deviation indicator 302 has range from the lateral indicator target point mark 319 with respective target point center line 320 to maximum lateral indicator mark 317 with respective maximum lateral indicator centerline 318, with lateral indicator rotation point 324. Angle "i" 325 is the angle from the zero lateral indicator target center line 320 to the lateral indicator centerline 326. The angle "g" 321 is the lateral indicator travel range angle from maximum lateral indicator position centerline 318 to the lateral indicator target point center line 320.

A variety of markings may exist between the maximum left position mark 305 and the zero-course deviation indicator position mark 307 for clarity. Likewise, a variety of markings may exist between the maximum right position mark 306 and the zero indicator mark zero-course deviation indicator position mark 307. Similarly, between the lateral indicator target point mark 319 and the maximum lateral indicator mark 317, a variety of intermediate markings may exist.

Display 301 shows the positional relationship of both the direction and the distance of the truck 210 to the desired approach course 213 and to target loading point 203. The resulting incorporation of showing the direction and distance on display 301 allows for repeatable accurate path control and location stopping point control of truck 210. The motion control can be attained with solely human commanded vehicular control, a combination of human vehicular control and automated assisted vehicular control, and to fully automated vehicular control.

Figure 4:
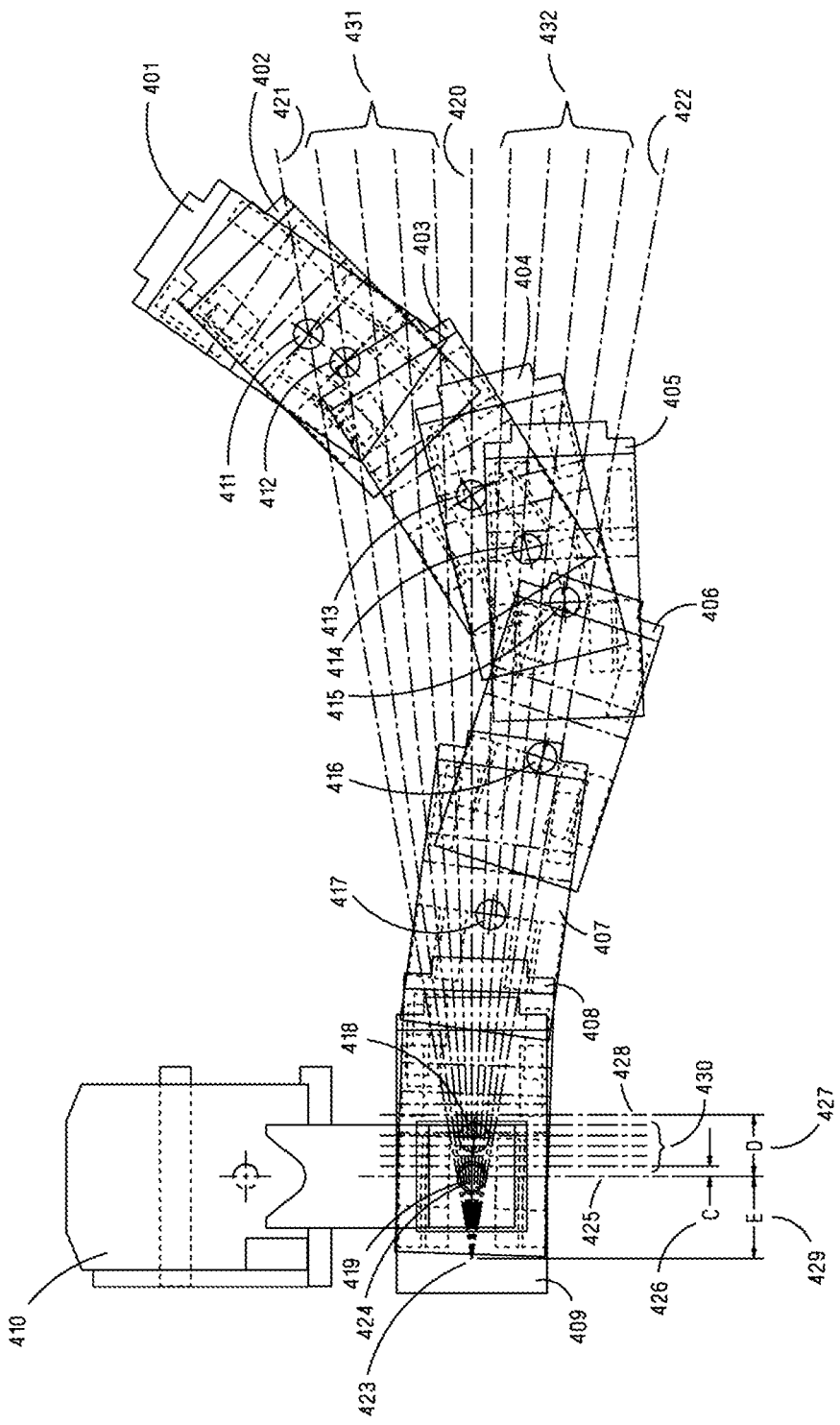
FIG. 4 is a top view multiple positions layout drawing of a vehicle spotting maneuver according to one embodiment.

FIG. 4 is a top view drawing depiction of an example spotting maneuver with multiple individual positions of a dump truck 101 maneuvering towards a loading shovel 410. Shown are position 1 truck 401 with respective position 1 truck receiving point 411, position 2 truck 402 with respective position 2 truck receiving point 412, position 3 truck 403 with respective position 3 truck receiving point 413, position 4 truck 404 with respective position 4 truck receiving point 414, position 5 truck 405 with respective position 5 truck receiving point 415, position 6 truck 406 with respective position 6 truck receiving point 416, position 7 truck 407 with respective position 7 truck receiving point 417, position 8 truck 408 with respective position 8 truck receiving point 418, position 9 truck 409 with respective position 9 truck receiving point 419. Position 9 truck 409 is shown positioned with respective position 9 truck receiving point 419 at the target loading point 424 exactly. Desired approach line 420 is formed from the perpendicular of the shovel boom bucket line 425 which passes through the target loading point 424. The shovel boom bucket line 425 is a line formed parallel to the shovel boom which passes through the target loading point 424. The maximum indicator positional line left 421 and maximum indicator position line right 422 are representative of the positional relationship to the operator interface display 301 maximum left position mark 305 and maximum right position mark 306, respectively. Other positional left lines 431 and positional right lines 432 represent other positional relationships relative to the desired approach line 420 which represents the positional relationship to the operator interface display 301 zero course deviation indicator position mark 307. These course positional lines 421, 431, 420, 432, 422 originate from the virtual origin point 423 which is offset beyond the target loading point 424 by distance E 429. The maximum lateral indicator positional line 428 represents positional relationship to the operator interface display 301 maximum lateral indicator mark 317. The shovel boom bucket line 425 represents the positional relationship to the operator interface display 301 lateral indicator target point mark 319. Distance C 426 represents a position relationship to the operator interface display 301 marking that is nearest to lateral indicator target point mark 319 with remaining in like manner lateral indicator positional lines 430 representing larger distances of distance C 426 through representation of larger angles "i" 325 of the lateral deviation indicator 302 with the largest at the maximum lateral indicator mark 317 at the maximum lateral indicator positional line 428. Distance D 427 represents the positional distance through which represents the operator interface display 301 lateral indicator travel range angle "g" 321.

The directions of lateral deviation indicator 302, course deviation indicator 303, and heading indicator 304 show in FIG. 3 in relation to the truck positions in FIG. 4 may be reversed or different from the directions shown in FIG. 3.

For example, course deviation indicator 303 may be configured to be positioned to the right of zero-course deviation position mark 307 when receiving point 211 is below the desired approach course 213.

Figure 5:
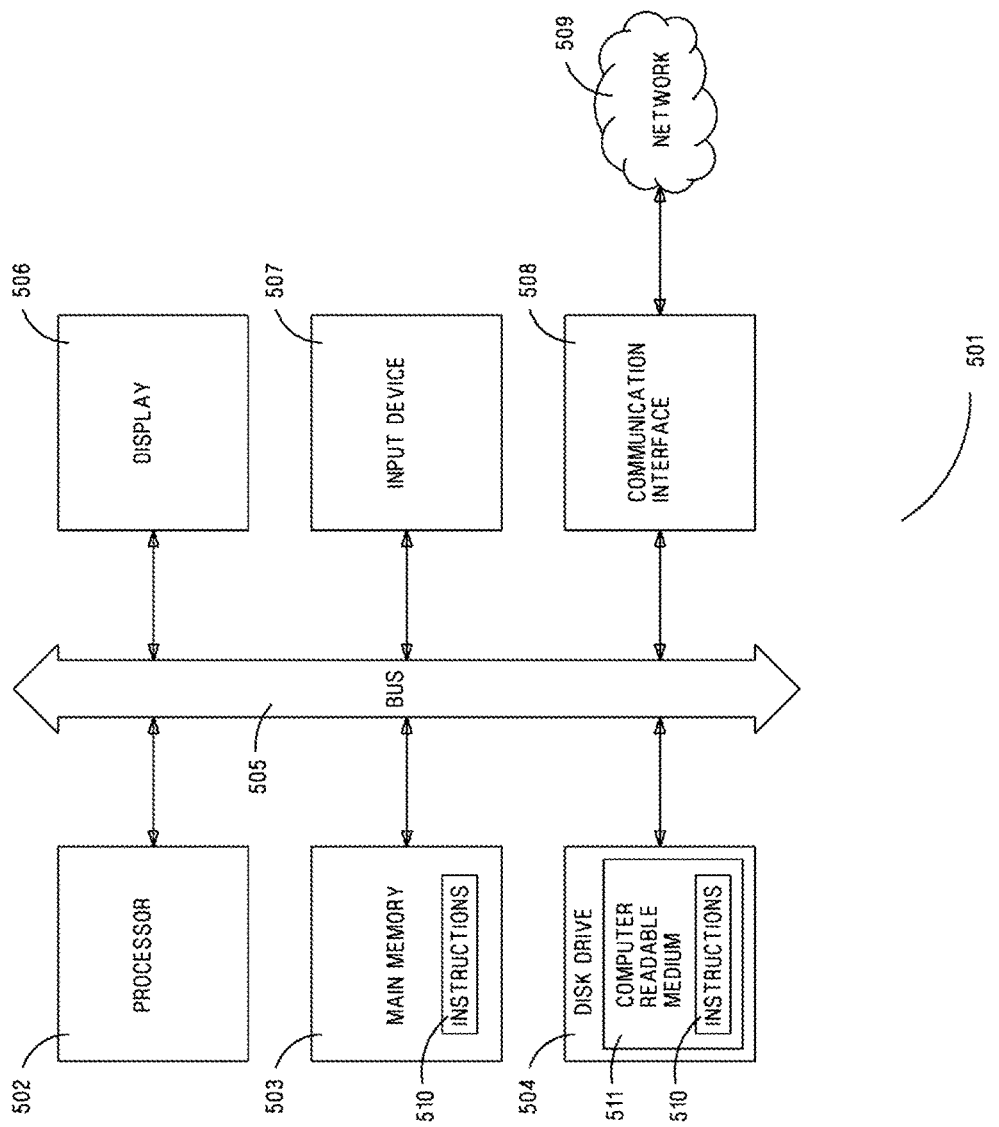
FIG. 5 is an example controller unit according to one embodiment.

FIG. 5 is an illustrative example of an embodiment of a controller unit 501 usable and configured to run any of the vehicles, processes, or display interfaces as described in relation to all figures presented herein. The controller unit 501 may include a processor 502, such as, a central processing unit (CPU), a graphics processing unit (GPU), or combinations and variations of multiples of each. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually, otherwise known as being programmed.

The controller unit 501 may include a memory 503 than can communicate via a bus 505. The memory 503 may be a main memory, a static memory, or a dynamic memory. The memory 503 may include, but may not be limited to computer readable storage media such as various types of volatile and non-volatile storage media, including but not limited to random access memory, read only memory, programmable read-only memory, electrically programmable read-only memory, electrically erasable read-only memory, flash memory, magnetic tape or disk, optical media and the like. In one case, the memory 503 may include a cache or random access memory for the processor 502. Alternatively, or in addition, the memory 503 may be separate from the processor 502, such as a cache memory of a processor, the system memory, or other memory. The memory 503 may be an external storage device or database for storing data. Examples may include a hard drive, compact disc (CD), digital video disc (DVD), memory card, memory stick, floppy disc, universal serial bus (USB) memory device, or any other device operative to store data. The memory 503 may be operable to store instructions 510 executable by the processor 502. The functions, processes, acts or tasks illustrated in the figures or described herein may be performed by the programmed processor 502 executing the instructions 510 stored in the memory 503. Alternatively or in addition the instructions 510 for carrying out the functions, process, acts or tasks described herein may be embedded in hardware, software, or some combination of both, such as read only memory (ROM) in the controller. The functions, processes, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The controller unit 501 may also include a disk or optical drive unit 504. The disk drive unit 504 may include a computer readable medium 511 in which one or more sets of instructions 510, also known as software, can be embedded. Further, the instructions 510 may perform one or more of the methods or logic as described herein. The instructions 510 may reside completely, or at least partially, within the memory 503 and or within the processor 502 during execution by the controller unit 501. The memory 503 and the processor 502 also may include computer readable media as discussed above.

The controller unit 501 may further include, or be in communication with, a display 506, such as a liquid crystal display (LCD), an organic light emitting diode (OLED), a flat panel display, a solid state display, a cathode ray tube (CRT), a projector, a printer or other now known or later developed display device for outputting determined information. The display 506 may operate similarly to the display embodiments described in reference to FIG. 3. The display 506 may act as an interface for the user to see the functioning of the processor 502, or specifically as an interface with the software or instructions 510 stored in the memory 503 or in the drive unit 504.

Additionally, the controller unit 500 may include, or be in communication with an input device 507 configured to allow a user to interact with any of the components of controller unit 501. The input device 507 may be a number pad, a keyboard, or a cursor control device, such as a mouse, or a joystick, touch screen display, remote control or any other device operative to interact with the controller unit 501. The input device 507 may be part of the display 506.

The present disclosure contemplates a computer readable medium 511 that includes instructions 510 or receives and executes instructions 510 responsive to a propagated signal; so that a device connected to a network 509 may communicate voice, video, audio, images or any other data over the network 509. Further, the instruction 510 may be transmitted or received over the network 509 via a communication interface 508. The communication interface 508 may be a part of the processor 502 or may be a separate component. The communication interface 508 may be created in software or may be a physical connection in hardware. The communication interface 508 may be configured to connect with a network 509, additional devices, external media, the display 506, or any other components in controller unit 501, or combinations thereof. The connection with the communication interface 508 may be physical connection, such as a serial interface RS-232 connection, wired Ethernet connection, wireless connection as discussed below, or any other type of connection. Likewise, the additional connections with other components of the controller unit 501 may be physical connections or may be established wirelessly.

The network 509 may include additional devices used in conjunction with wired networks, wireless networks, or combinations thereof. The wireless network may be a cellular telephone network, an 802.11, 802.16, 802.20, or WiMax network. Further, the network 509 may be a public network, such as the Internet, a private network, such as an intranet, or combinations thereof, and may utilize a variety of networking protocols now available or later developed including, but not limited to TCP/IP based networking protocols, encrypted messaging and authentications, dual key encryptions, and others both readily known and future derivations.

The computer readable medium 511 may be a single medium, or the computer readable medium 511 may be multiple media, such as a centralized or distributed database, associated cashes and servers that store one or more sets of instructions. The term computer readable medium may also include any medium that may be capable of storing, encoding or carrying a set of instructions for execution by a processor or that may cause a computer system to perform any one or more of the methods or operations disclosed herein.

The computer readable medium 511 may include a solid state memory such as a memory card or other package that houses one or more non-volatile read-only memories. The computer readable medium 511 also may be a random access memory or other volatile re-writable memory. Additionally, the computer readable medium 511 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer readable medium or distribution medium and other equivalents and successor media, in which data or instructions may be stored.

Figure 6:
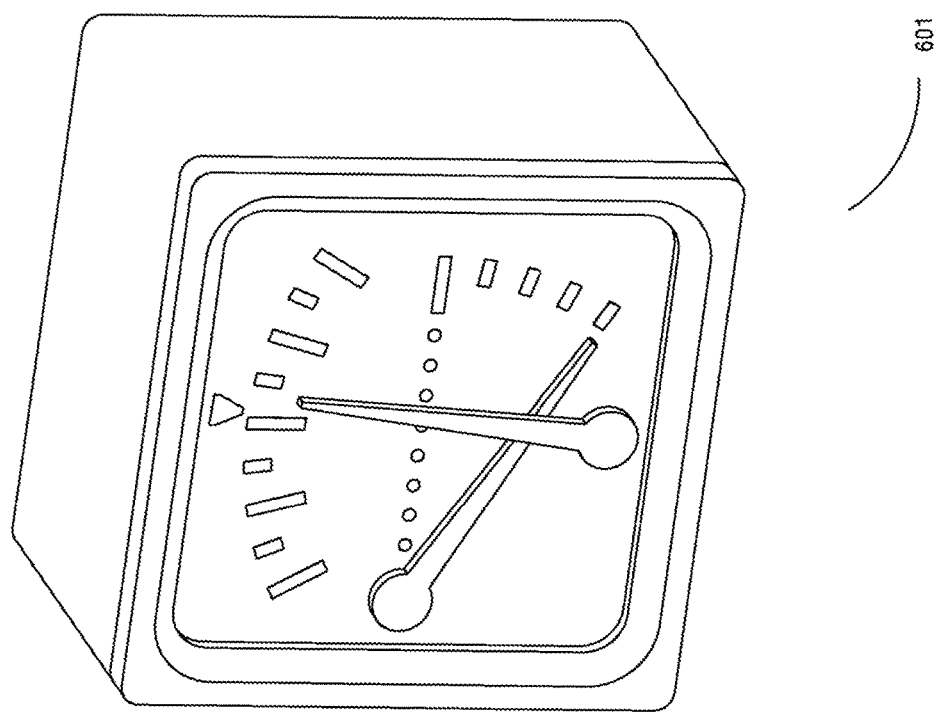
FIG. 6 is an isometric view of an example display interface module according to one embodiment.

FIG. 6 is an isometric view drawing of one embodiment of an interface display 601 with display similar as display 301.

Figure 7:
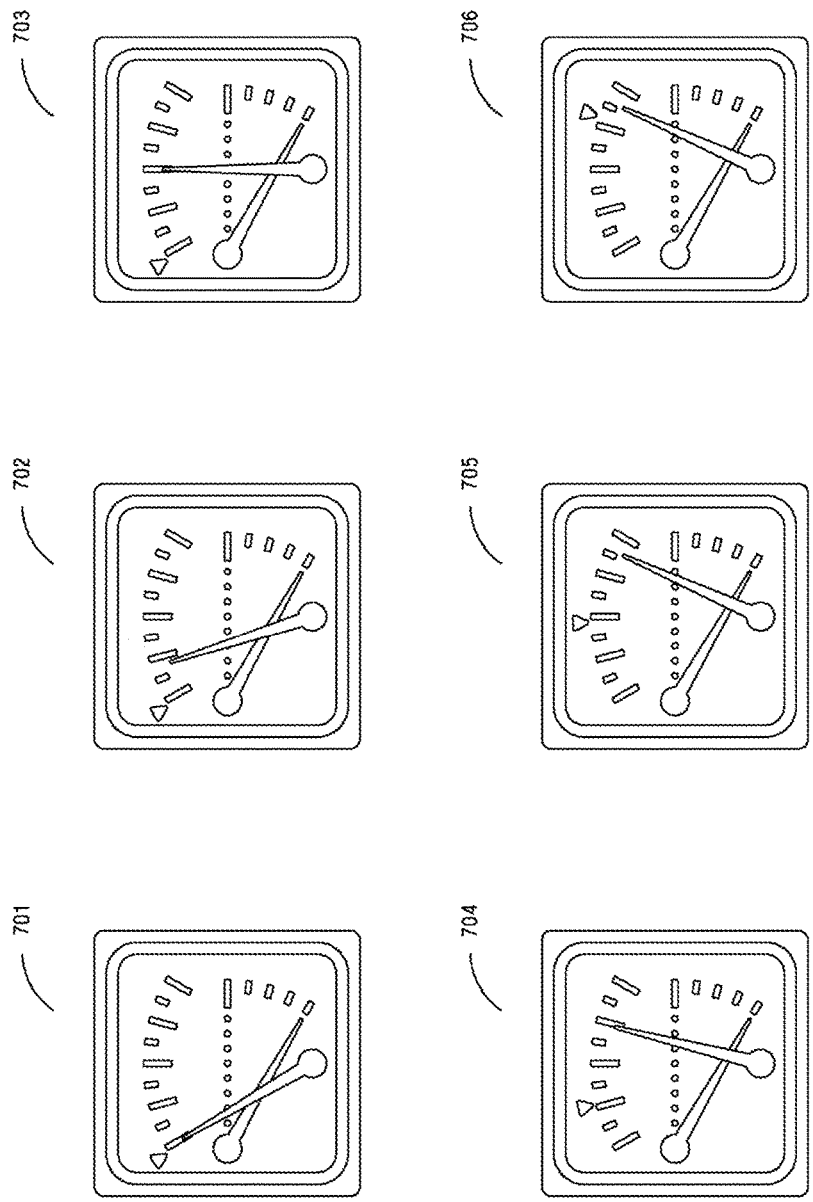
FIG. 7 is an example display interface module with various indications shown according to one embodiment.

FIG. 7 is a drawing of a set of several display depictions corresponding to the described positions of FIG. 4 above. The displays depicted in FIG. 7 include the same components as display 301. FIG. 7 shows various positions of lateral deviation indicator 302, course deviation indicator 303, and heading indicator 304 for truck positions 401, 402, 403, 404, 405, and 406. Display 701 corresponds to position 401. Display 702 corresponds to position 402. Display 703 corresponds to position 403. Display 704 corresponds to position 404. Display 705 corresponds to position 405. Display 706 corresponds to position 406.

Figure 8:
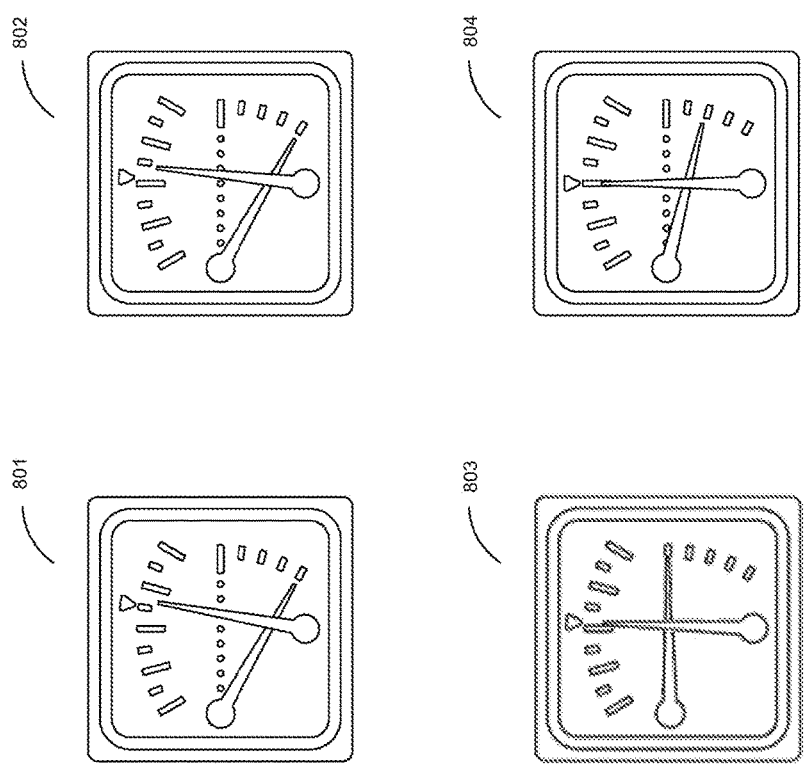
FIG. 8 is an example display interface module with various indications shown according to one embodiment.

FIG. 8 is a drawing of a set of several display depictions corresponding to the described positions of FIG. 4 above. The displays depicted in FIG. 8 include the same components as display 301. FIG. 8 shows various positions of lateral deviation indicator 302, course deviation indicator 303, and heading indicator 304 for truck positions 407, 408, and 409. Display 801 corresponds to position 407. Display 802 corresponds to position 408. Display 803 corresponds to position 409. Display 804 corresponds to a position between position 407 and position 408 that is not formally shown on FIG. 4.

Figure 9:
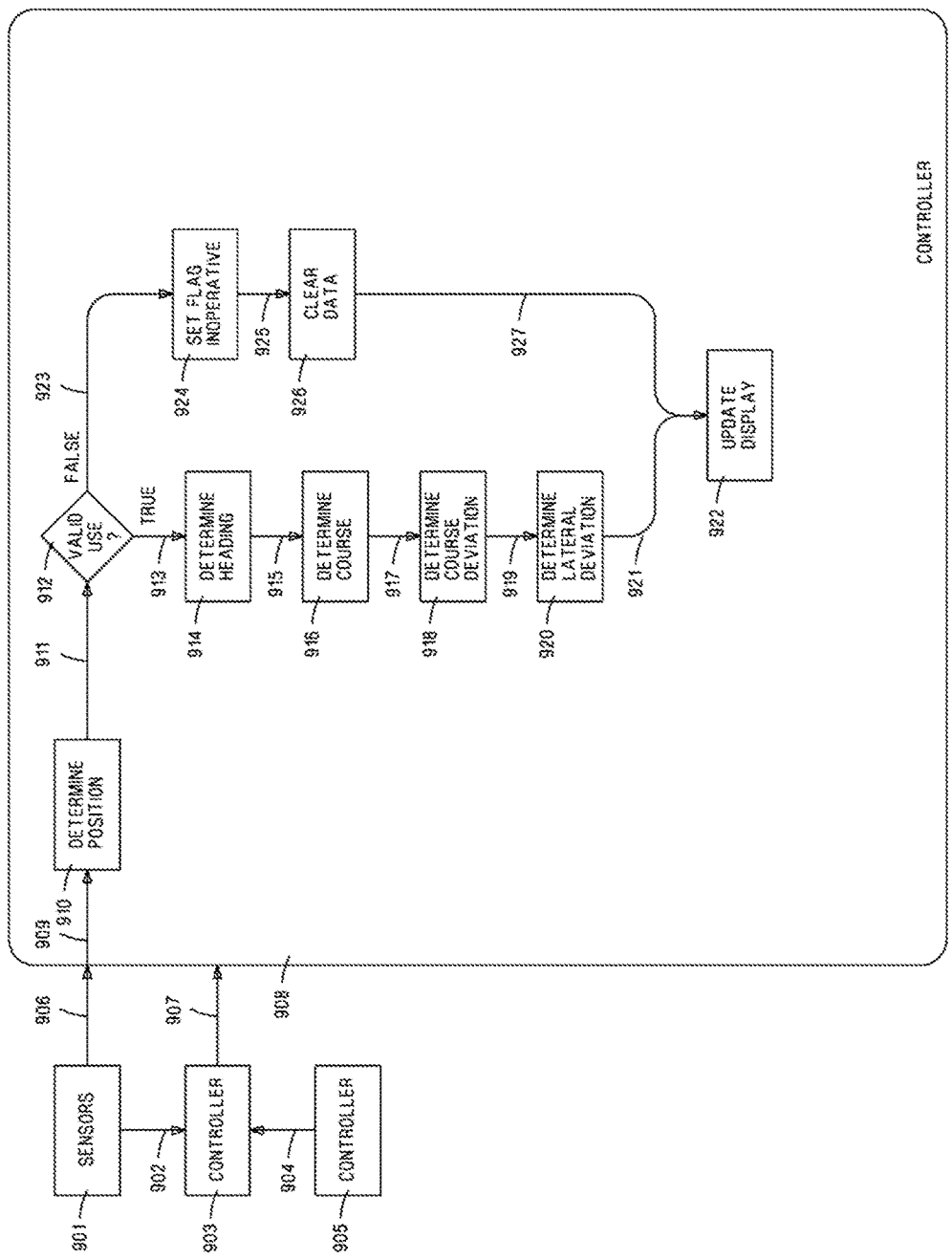
FIG. 9 is a flow diagram for a controller unit according to one embodiment.

FIG. 9 is a logic diagram example of an embodiment display 301. A controller 908 may receive information along path 906 from various sensors 901 directly or may receive information indirectly through sensor signal path 902 to controller 903 through information path 907, or indirectly from an example other controller 905 through information path 904 to controller 903 through information path 907. The information provided to controller 908 may include any type of information related to the position of the truck or information from which the position of the truck can be determined, such as GPS coordinates, GPS angles, radio direction signals, navigation device data, calculated angles or distances, etc. Sensor 901 and controllers 903 or 905 may be any type of sensor, controller, or device used to determine distances or positions, such as navigation devices, GPS devices, radar devices, steering sensors, speed sensors, radio sensors, etc. The controller 908 then can take the information received along path 909 to calculate determine position block 910. Derived and raw, or a combination thereof, information is then passed along path 911 to decision block 912 for determining the validity of the information. True path 913 for validity then leads to calculation block 914 for determination of a heading value, then leads along path 915 for calculation block 916 for determination of a course value, then leads along path 917 for calculation block for determination of a course deviation value block 918, then leads along path 919 for calculation block for determination of a lateral deviation value block 920 which then leads along path 921 to final update display block 922.

Alternatively, validity false path 923 leads to calculation block for setting flag inoperative block 924 which leads along path 925 for calculation block for clearing data values block 926 which leads along path 927 to calculation block final update display block 922. Updating the display also includes an indication that the information displayed is valid for usage, such as for example, an error indication if the information is invalid or unreliable.

The vehicles, processes, display interfaces, and controllers described herein solve the problems addressed in the background section by providing a means to signal the travel path of a vehicle more accurately. This in turn optimizes the positional state and provides cued immediate feedback response which in turn is readily available for the correction to controls inputs, whether human or machine automation manipulated.

While various embodiments of the invention have been described, it will be apparent to those of ordinary skill in the art that many more embodiments and implementations are possible within the scope of the invention. Accordingly, the invention is not to be construed as restricted to the examples shown of the attached claims and their equivalents.

The invention claimed is:

1. A display module for a vehicle comprising:
   a course deviation indicator that is configured to provide an indication of a first angle between a desired approach course and a first line, wherein the first line extends between a first point on the vehicle and a virtual origin point;
   a heading indicator that is configured to provide an indication of a second angle between a vehicle forward alignment and the desired approach course, wherein the vehicle forward alignment is a longitudinal centerline of the vehicle that extends through the first point on the vehicle;
   a lateral deviation indicator that is configured to provide an indication of a distance from the first point on the vehicle to a loading line, wherein the loading line extends through a loading point;
   wherein the loading point is located on the desired approach course and the desired approach course is a desired course for the vehicle to approach the loading point.

2. The display module of claim 1, wherein the virtual origin point is located on the desired approach course on a side of the loading point that is opposite the vehicle when the vehicle is approaching the loading point, wherein the virtual origin point is offset from the loading point.

3. The display module of claim 2, wherein the offset between the virtual origin point and the loading point is sized based on sensitivity of measurements used to determine a position of the vehicle.

4. The display module of claim 1, wherein the vehicle is a off-highway dump truck and the first point on the vehicle is a receiving point.

5. The display module of claim 1, wherein the desired approach course is a straight path.

6. The display module of claim 1, further comprising:
   a left maximal position mark configured to provide an indication of the maximal position of the first angle and the second angle relative to a first side of the desired approach course; and
   a right maximal position mark configured to provide an indication of the maximal position of the first angle and the second angle relative to a second side of the desired approach course.

7. The display module of claim 1, wherein the course deviation indicator provides an indication of the first angle that is scaled in magnitude and the heading indicator provides an indication of the second angle that is scaled in magnitude.

8. The display module of claim 1, further comprising a zero-course deviation mark that is configured to indicate that no course deviation is required for the vehicle to stay on the desired approach course when the course deviation indicator is aligned with the zero-course deviation mark,
wherein the course deviation indicator is on a first side of the zero-course deviation mark when the first point on the vehicle is on a first side of the desired approach course and the course deviation indicator is on a second side of the zero-course deviation mark when the first point on the vehicle is on a second side of the desired approach course,
wherein the heading indicator is on the first side of the zero-course deviation mark when the vehicle forward alignment is on the first side of the desired approach course and the heading indicator is on the second side of the zero-course deviation mark when the vehicle forward alignment is on the second side of the desired approach course.

9. The display of claim 8, wherein the course deviation indicator is substantially vertical when the course deviation indicator is aligned with the zero-course deviation mark and the lateral deviation indicator is substantially horizontal when the distance from the first point on the vehicle to the loading line is zero.

10. The display of claim 1, wherein the loading line is not parallel to the desired approach course.

11. The display of claim 1, wherein the loading line is perpendicular to the desired approach course.

12. A method of indicating a position of a vehicle using a display, wherein the display comprises a course deviation indicator, a heading indicator, and a lateral deviation indicator, the method comprising:
establishing a desired approach course that extends through a loading point and a virtual origin point;
determining a first angle that is between the desired approach course and a first line, wherein the first line extends between a first point on the vehicle and the virtual origin point;
determining a second angle that is between a vehicle forward alignment and the desired approach course, wherein the vehicle forward alignment is a longitudinal centerline of the vehicle that extends through the first point on the vehicle;
determining a distance from the first point on the vehicle to a loading line, wherein the loading line extends through the loading point;
providing an indication of the first angle with the course deviation indicator;
providing an indication of the second angle with the heading indicator;
providing an indication of the distance from the first point on the vehicle to the loading line with the lateral deviation indicator.

13. The method according to claim 12, wherein the virtual origin point is located on the desired approach course on a side of the loading point that is opposite the vehicle when the vehicle is approaching the loading point, wherein the virtual origin point is offset from the loading point.

14. The method according to claim 13, wherein the offset between the virtual origin point and the loading point is sized based on sensitivity of measurements used to determine a position of the vehicle.

15. The method according to claim 12, wherein the vehicle is a off-highway dump truck and the first point on the vehicle is a receiving point.

16. The method according to claim 12, wherein the indication of the first angle provided by the course deviation indicator is scaled in magnitude and the indication of the second angle provided by the heading indicator is scaled in magnitude.

17. The method according to claim 12, wherein the display further comprises a zero-course deviation mark that is configured to indicate that no course deviation is required for the vehicle to stay on the desired approach course when the course deviation indicator is aligned with the zero-course deviation mark, the method further comprising
placing the course deviation indicator on a first side of the zero-course deviation mark when the first point on the vehicle is on a first side of the desired approach course;
placing the course deviation indicator on a second side of the zero-course deviation mark when the first point on the vehicle is on a second side of the desired approach course;
placing the heading indicator on the first side of the zero-course deviation mark when the vehicle forward alignment is on the first side of the desired approach course;
placing the heading indicator on the second side of the zero-course deviation mark when the vehicle forward alignment is on the second side of the desired approach course.

18. A method of positioning a receiving point on a vehicle at a loading point, the method comprising:
establishing a desired approach course that extends through the loading point and a virtual origin point;
determining a first angle that is between the desired approach course and a first line, wherein the first line extends between the receiving point on the vehicle and the virtual origin point;
determining a second angle that is between a vehicle forward alignment and the desired approach course, wherein the vehicle forward alignment is a longitudinal centerline of the vehicle that extends through the receiving point on the vehicle;
determining a distance from the receiving point on the vehicle to a loading line, wherein the loading line extends through the loading point;
moving the vehicle toward the loading point;
adjusting the motion of the vehicle and vehicle forward alignment relative to the desired approach course based on the first angle and second angle such that the vehicle moves toward the desired approach course;
moving the vehicle along the desired approach course;
adjusting the motion of the vehicle along the desired approach course based on the distance from the receiving point on the vehicle to the loading line;
stopping the vehicle when the receiving point reaches the loading point.

19. The method according to claim 18, wherein the method is performed by a controller that directs the vehicle through automated machine controls.

20. The method according to claim 18, wherein the virtual origin point is located on the desired approach course on a side of the loading point that is opposite the vehicle when the vehicle is approaching the loading point, wherein the virtual origin point is offset from the loading point.

* * * * *